(12) United States Patent
Hoffman et al.

(10) Patent No.: US 8,184,359 B2
(45) Date of Patent: May 22, 2012

(54) LASER PROJECTOR DISPLAY MODULES AND ARRANGEMENTS OF COMPONENTS OF LASER PROJECTOR DISPLAY MODULES

(75) Inventors: William F. Hoffman, Palatine, IL (US); Tomasz L. Klosowiak, Glenview, IL (US); Lawrence E. Lach, Chicago, IL (US); Junhua Liu, Roselle, IL (US); Ion V. Nicolaescu, Carpentersville, IL (US); Min-Xian M. Zhang, Inverness, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1453 days.

(21) Appl. No.: 11/616,855

(22) Filed: Dec. 27, 2006

(65) Prior Publication Data

US 2008/0158653 A1    Jul. 3, 2008

(51) Int. Cl.
   *G02B 26/08*    (2006.01)

(52) U.S. Cl. ..................................................... 359/298
(58) Field of Classification Search ....................... None
   See application file for complete search history.

(56) References Cited

U.S. PATENT DOCUMENTS

| 6,802,451 | B2 * | 10/2004 | Yavid et al. ............. 235/472.01 |
| 6,937,221 | B2 | 8/2005 | Lippert et al. |
| 2004/0075624 | A1 * | 4/2004 | Tegreene et al. .................. 345/7 |

* cited by examiner

*Primary Examiner* — Tammy Pham

(57) ABSTRACT

A laser projector display module for a handheld device may include an electronics module, a miniaturized light source module electrically connected with the electronics module, a scanner module electrically connected with the electronics module, and an optical assembly configured to direct light from the light source onto the scanner module. The scanner module and the light source module may abut the electronics module.

19 Claims, 1 Drawing Sheet

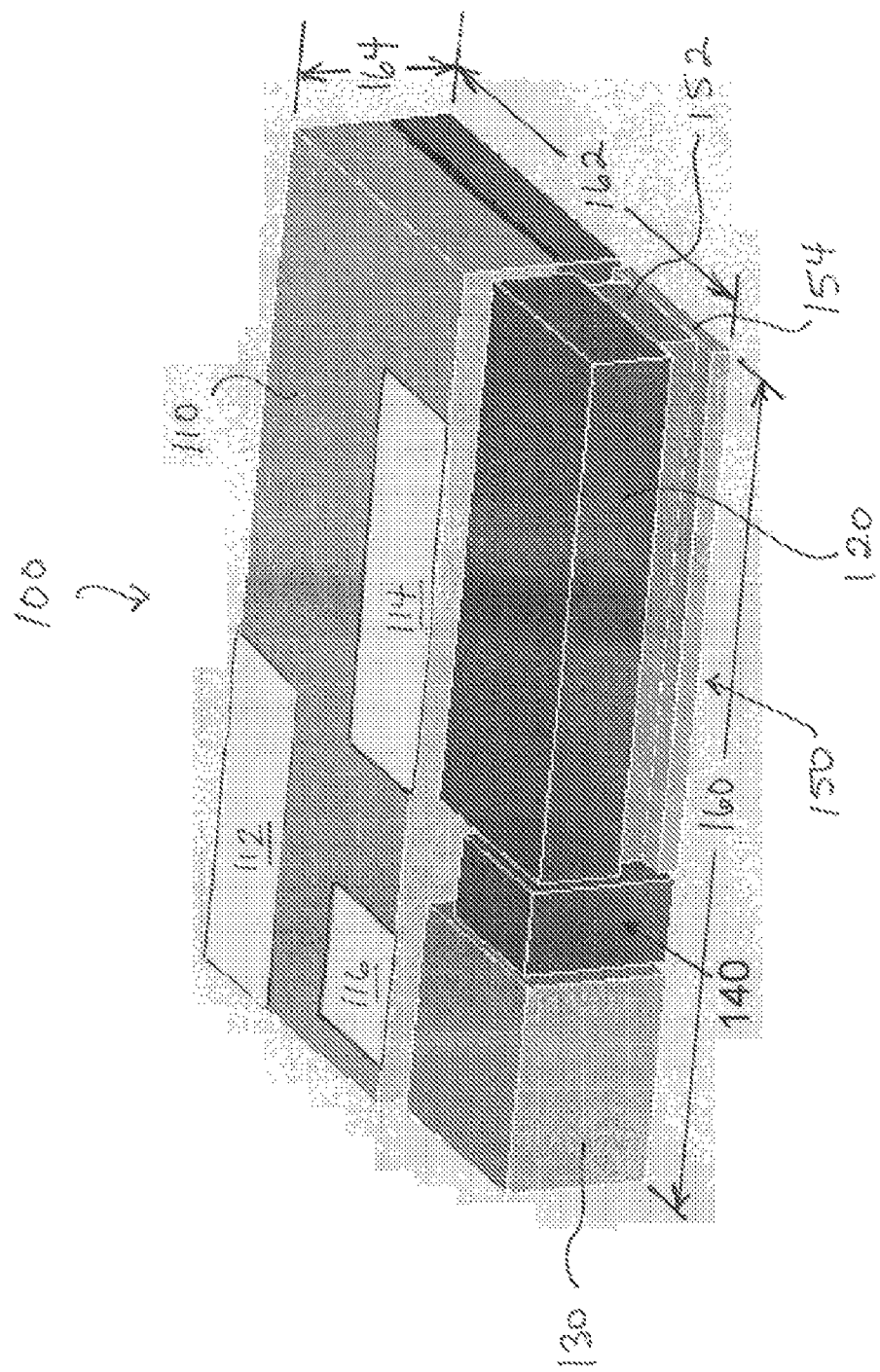

LASER PROJECTOR DISPLAY MODULES AND ARRANGEMENTS OF COMPONENTS OF LASER PROJECTOR DISPLAY MODULES

TECHNICAL FIELD

The present invention is directed to laser projector display modules. More particularly, the present invention is directed to arrangements of components of laser projection display modules for use in, for example, a handheld device.

BACKGROUND

As handheld and other portables devices, such as cell phones, personal digital assistants, personal information devices, pagers, mp3 players, iPods, and the like, continue to evolve, the display has become an increasingly important part of the user experience. Indeed, the size and weight of these devices have dramatically decreased while the display pixel count has increased many-fold.

Realistically, the increase in pixel count is limited by the size of the handset. For a fixed display size, an increase in pixel count has to come with a reduction of pixel size, and dropping the pixel size below the resolving power of the human eye does not bring added value to the display. Thus, any further increase in display pixel count for cell phones will necessarily require the image size to increase.

Because of the continued increase in network bandwidth, processing power, and memory on handheld and other portable devices, a larger image size is desirable in order to make more information and application available on these devices. The desire for a larger image size necessitates the need to increase display size.

For the conventional, direct view display employed currently, the image size is equal to the size of the active area of the display. The size of the active area, in turn, determines the size of the overall mechanical size of the display module, assuming of course that the display cannot be bent or folded. Given the consumer's general desire to keep the handset size small, the display module size cannot get much larger.

Some conventional portable instruments have included alternative technologies for providing a large image size while keeping the display module small enough to fit in the handset. For example, U.S. Pat. No. 6,802,457, describes a portable instrument having an image projector module as a display alternative to a liquid crystal display device.

It may be desirable to provide a handheld or other portable device with a laser projector display module having its components arranged to minimize the size of the device while addressing other design issues, such as thermal management, electrical layout, and optical performance.

SUMMARY OF THE INVENTION

According to various aspects of the disclosure, an arrangement of components of a laser projector display module for a handheld device may include an electronics module having a longitudinal dimension, a lateral dimension, and a depth. A miniaturized light source module may extend alongside a first portion of a first side of the electronics module in a direction of the longitudinal dimension. A scanner module may extend alongside a second portion of the first side of the electronics module in the longitudinal direction. The light source module and the scanner module may be electrically connected with the electronics module. An optical assembly may be configured to direct light from the light source onto the scanner module. A thermal management system configured to control temperature of the laser projector display module may extend alongside the first portion of the first side of the electronics module. The light source module and the thermal management system being stacked in a direction of the depth.

In some aspects of the disclosure, a laser projector display module for a handheld device may include an electronics module, a miniaturized light source module electrically connected with the electronics module, a scanner module electrically connected with the electronics module, and an optical assembly configured to direct light from the light source onto the scanner module. The scanner module and the light source module may abut the electronics module.

BRIEF DESCRIPTION OF THE DRAWINGS

FIG. 1 is a perspective view of a laser projector display module in accordance with various aspects of the disclosure.

DETAILED DESCRIPTION

An exemplary embodiment of a laser projector display module 100 is illustrated in FIG. 1. According to various aspects, the laser projector display module 100 may be used in a handheld device, such as, for example, a cell phone, personal digital assistant, personal information device, pager, mp3 player, iPod, or the like.

According to various aspects of the disclosure, the laser projector display module 100 may include an electronics module 110. The electronics module 110 may include a connector 112 configured to be electrically connected to an application-specific integrated circuit (ASIC).

The laser projector display module may include a miniaturized light source module 120 electrically connected with the electronics module 110 via connector 114. The light source module 120 may comprise one or more lasers, as is known by persons of ordinary skill in the art.

In accordance with various aspects, the electronics module 110 includes control electronics and/or drive electronics for the one or more lasers. For example, the control electronics may comprise Return-to-Zero (RZ) electronics. The electronics module 110 may include, but is not limited to including, high energy amplifiers, control electronics (e.g., RZ electronics), optical power monitoring electronics (e.g., photodiode sensor), thermal monitoring electronics, and/or thermal control systems for the light source module and lasers. According to some aspects of the disclosure, the miniaturized light source module 120 may be connected with the electronics module 110 via a flexible cable soldered directly to the amplifier section of the electronics.

A scanner module 130 may be proximate the light source module 120 and electrically connected with the electronics module 110 via connector 116. The scanner module 130 may include one or more scan mirrors (not shown) configured to be illuminated by the lasers and produce a display image.

The laser projector display module 100 may include an optical assembly 140 configured to direct light from the light source module 120 onto the scanner module 130. The optical assembly 140 may be in the path of the light emitting from the light source (e.g., the one or more lasers). The optical assembly 140 may contain one or more optical elements (not shown) configured to focus the light from the light source module onto the one or more scan mirrors of the scanner module 130. The optical assembly 140 may alternatively be incorporated within either the scanner module 130 or the light source module 120.

As shown in FIG. 1, according to some aspects of the disclosure, the scanner module 130 and the light source module 120 may abut the electronics module 110. The electronics module 110 has a longitudinal dimension, a lateral dimension, and a depth.

According to various aspects, the miniaturized light source module 120 may extend alongside a first portion of a first side of the electronics module in a direction of the longitudinal dimension. The scanner module 130 may extend alongside a second portion of the first side of the electronics module in the longitudinal direction. The scanner module 130 and the light source module 120 may be aligned in the longitudinal dimension.

The laser projector display module 100 may further include a thermal management system 150 configured to control the temperature of the laser projector display module 100. According to various aspects of the disclosure, the thermal management system 150 may include a thermoelectric cooler 152 and/or a heat sink 154. The thermal management system may extend alongside the first portion of the first side of the electronics module. According to some aspects, the light source module and the thermal management system may be stacked in a direction of the depth.

According to various aspects of the disclosure, the laser projector display module may have a maximum longitudinal dimension 160 less than or equal to about 50.0 mm, a maximum lateral dimension 162 less than or equal to about 35.0 mm, and a maximum depth 164 less than or equal to about 8.5 mm. For example, in an exemplary embodiment, the laser projector display module 100 may have a longitudinal dimension 160 equal to about 40.0 mm, a lateral dimension 162 equal to about 27.2 mm, and a depth 164 equal to about 7.9 mm.

In some aspects, as shown in FIG. 1, the depth of the electronics module is greater than a depth of the scanner module. The depth of the electronics module is greater than combined depths of the light source module and the thermal management system. The longitudinal dimension of the electronics module is greater than combined longitudinal dimensions of the scanner module and the light source module.

It should be appreciated that the electronics module 110 may include high speed, high power electronics whose performance can be degraded by the length of connectors or circuit board. Thus, the arrangement and/or its compactness disclosed herein may minimize electrical artifacts while facilitating use in thinner and more compact handheld and other portable devices.

It will be apparent to those skilled in the art that various modifications and variations can be made in the laser projector display modules and arrangements of components of laser projector display modules of the present invention without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An arrangement of components of a laser projector display module for a handheld device, the arrangement comprising:
   an electronics module having a longitudinal dimension, a lateral dimension, and a depth;
   a miniaturized light source module extending alongside a first portion of a first side of the electronics module in a direction of the longitudinal dimension, the light source module being electrically connected with the electronics module;
   a thermal management system extending alongside the first portion of the first side of the electronics module, the light source module and the thermal management system being stacked in a direction of the depth, the thermal management system being configured to control temperature of the laser projector display module;
   a scanner module extending alongside a second portion of the first side of the electronics module in the longitudinal direction, the scanner module being electrically connected with the electronics module; and
   an optical assembly configured to direct light from the light source onto the scanner module.

2. The arrangement of claim 1, wherein the scanner module and the light source module are aligned in the longitudinal direction.

3. The arrangement of claim 1, wherein the light source module and the scanner module abut the electronics module.

4. The arrangement of claim 1, wherein the depth of the electronics module is greater than a depth of the scanner module.

5. The arrangement of claim 1, wherein the depth of the electronics module is greater than combined depths of the light source module and the thermal management system.

6. The arrangement of claim 1, wherein the longitudinal dimension of the electronics module is greater than combined longitudinal dimensions of the scanner module and the light source module.

7. The arrangement of claim 1, wherein the laser projector display module has a longitudinal dimension less than or equal to about 50.0 mm, a lateral dimension less than or equal to about 35.0 mm, and a depth less than or equal to about 8.5 mm.

8. The arrangement of claim 1, further comprising a flexible cable extending from the light source module and being connected to an amplifier section of the electronics module.

9. The arrangement of claim 1, wherein the electronics module includes a connector configured to be connected with an application-specific integrated circuit.

10. The arrangement of claim 1, where in the light source module and the scanner module are proximate one another.

11. A laser projector display module for a handheld device, the laser projector display module comprising:
    an electronics module;
    a miniaturized light source module electrically connected with the electronics module; and
    a scanner module electrically connected with the electronics module, the scanner module and the light source module abutting the electronics module; and
    an optical assembly configured to direct light from the light source onto the scanner module.

12. The display module of claim 11, wherein the electronics module has a longitudinal dimension, a lateral dimension, and a depth, the miniaturized light source module extending alongside a first portion of a first side of the electronics module in a direction of the longitudinal dimension, the scanner module extending alongside a second portion of the first side of the electronics module in the longitudinal direction, and the scanner module and the light source module being aligned in the longitudinal dimension.

13. The display module of claim 12, further comprising a thermal management system extending alongside the first portion of the first side of the electronics module, the light source module and the thermal management system being stacked in a direction of the depth, the thermal management system being configured to control temperature of the laser projector display module.

14. The display module of claim 12, wherein the depth of the electronics module is greater than a depth of the scanner module.

15. The display module of claim 13, wherein the depth of the electronics module is greater than combined depths of the light source module and the thermal management system.

16. The display module of claim 12, wherein the longitudinal dimension of the electronics module is greater than combined longitudinal dimensions of the scanner module and the light source module.

17. The display module of claim 11, wherein the laser projector display module has a longitudinal dimension less than or equal to about 50.0 mm, a lateral dimension less than or equal to about 35.0 mm, and a depth less than or equal to about 8.5 mm.

18. The display module of claim 11, further comprising a flexible cable extending from the light source module and being connected to an amplifier section of the electronics module.

19. The display module of claim 11, wherein the electronics module includes a connector configured to be connected with an application-specific integrated circuit.

* * * * *